Feb. 5, 1929.

F. J. HEIDEMAN 1,701,185

EXPANSION VALVE

Filed Sept. 21, 1925

Inventor
Fred J. Heideman

By Whittemore Hulbert Whittemore
+Belknap  Attorneys

Patented Feb. 5, 1929.

1,701,185

UNITED STATES PATENT OFFICE.

FRED J. HEIDEMAN, OF DETROIT, MICHIGAN, ASSIGNOR OF NINE-TENTHS TO THOMAS C. WHITEHEAD, OF DETROIT, MICHIGAN.

EXPANSION VALVE.

Application filed September 21, 1925. Serial No. 57,789.

This invention relates to expansion valves and more especially to devices of this character particularly adapted for use in connection with refrigerating and like apparatus.

Figure 1:
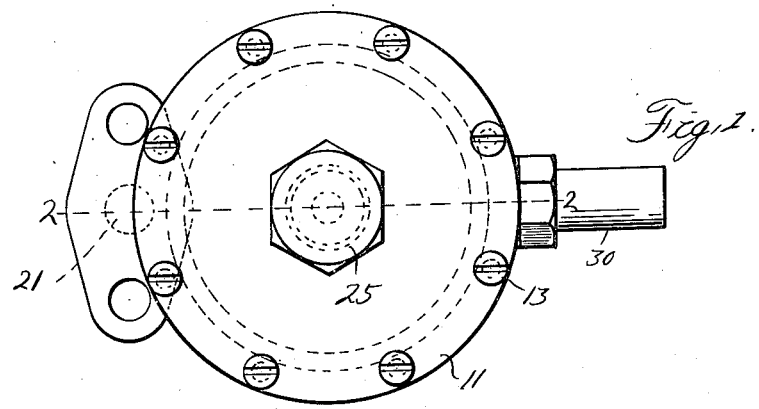
Figure 2:
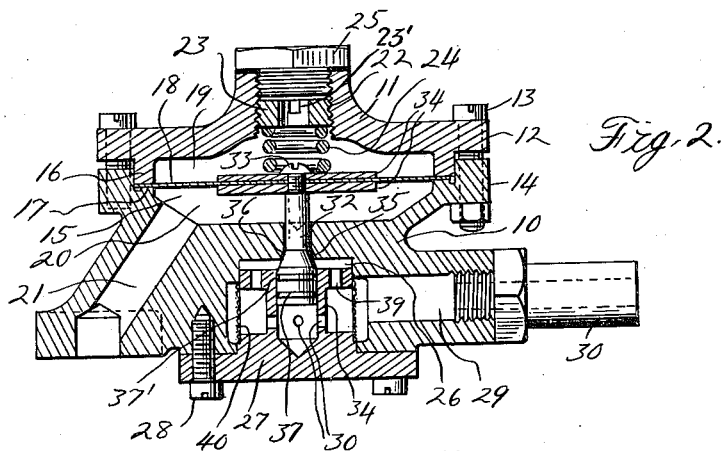
Figure 3:
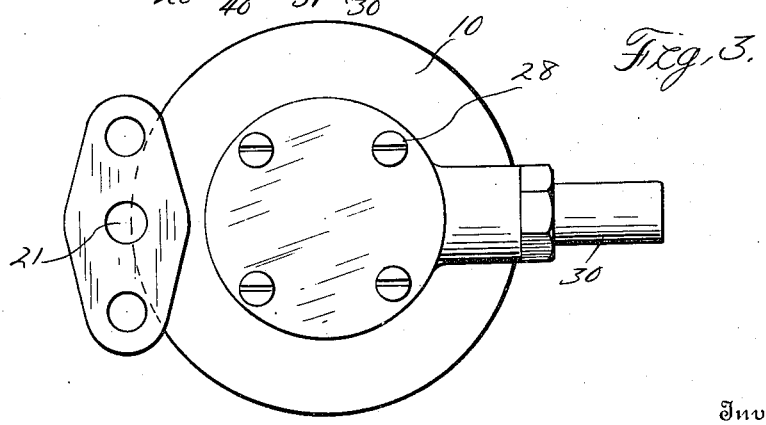

The invention has among its objects to simplify, render more efficient and improve generally devices of this character, and these, as well as other objects, advantages and novel details of construction will be made more apparent as this description proceeds, especially when considered in connection with the accompanying drawings wherein one illustrative embodiment of the invention is shown and wherein Figure 1 is a top plan view of an expansion valve constructed in accordance with this invention, Figure 2 is a vertical sectional view taken substantially on the plane indicated by the line 2—2 in Figure 1, and Figure 3 is a bottom plan view of the structure illustrated in Figure 2.

Referring now particularly to the drawings wherein like reference characters indicate like parts, it will be noted that the reference character 10 indicates generally the body of the valve suitably recessed and apertured to provide the chambers and passages yet to be described. Secured to the body 10 adjacent the top thereof is a cap plate 11 circumferentially flanged as at 12 and apertured at spaced intervals throughout the flange for the reception of bolts 13 adapted to pass therethrough and through aligned openings in a circumferential flange 14 formed on the body 10 whereby cap 11 may be removably secured in place.

The body 10 is suitably recessed, to form with a correspondingly recessed portion of the cap 11, a diaphragm chamber 15. Cap 11 is provided with a circumferential lip or rib 16 defining the periphery of chamber 15, and this rib together with a circumferential shoulder 17 constitute the means for clamping and holding a diaphragm 18, see particularly Figure 2. This diaphragm divides chamber 15 into upper and lower compartments 19 and 20, the lower one of which is in communication through passageway 21, and a suitable pipe connection, not shown, with the expansion coil in the brine tank, while the upper compartment is open to atmospheric pressure.

Cap plate 11 is provided with a centrally arranged threaded aperture 22 within which an adjusting nut or screw 23 is arranged. A spring 24 is interposed between the adjusting screw 23 and diaphragm 18, and by suitably adjusting screw 23 the pressure of spring 24 may be regulated so that the valve will operate at the desired pressure. A cap nut 25 also engaging the threaded aperture 22 protects diaphragm 18 from atmospheric condensation and prevents the collection or building up of frost thereon.

The body 10 is provided adjacent its lower side with a recess or chamber 26 into which a valve guide member 27 projects, this latter member being secured to the valve body as for instance by means of bolts 28. This member encloses chamber 26, which chamber has communicating therewith a passage 29 interiorly threaded adjacent the outer face of the valve to receive a nipple 30 by means of which connection is made with a conduit extending from the condenser and compressor.

The tubular extension 31 of valve guide member 27 is adapted to receive valve member 32 which is secured by means of a screw 35 to the diaphragm, the diaphragm being preferably centrally reinforced adjacent the connection to the valve by means of a pair of oppositely disposed reinforcing plates 34. The valve member 32 is formed with a tapered valve surface 35 adapted to engage a valve seat 36 formed on valve body 10. The enlarged portion 37 of valve member 32 is slidable in the tubular portion 31 of member 27, the space beneath the valve being open to the fluid entering passage 29 by means of a plurality of apertures 38. This construction not only affords a sliding support for the valve whereby the valve assists in holding the diaphragm in alignment but the fluid entering the space beneath the valve acts as an hydraulic cushion or dashpot therefor and effects a more steady and uniform operation of the valve. The portion 37 of the valve is provided with grooves 37' which fill with liquid and act as a seal for the valve. The fluid which enters passage 29 and escapes past the valve 35 flows through a plurality of apertures 39 arranged in a circumferential spacing flange formed on member 27. Surrounding the upper portion of member 27 and held in place thereby is a screen 40 through which the refrigerating fluid passes before flowing through the valve whereby any foreign matter contained therein is excluded from the valve and the continued and efficient operation of the valve thereby rendered more determinable.

As illustrated in Figure 2, the diaphragm adjusting nut or screw 23 is provided with a centrally arranged aperture 23' through which a suitable tool may be inserted for engagement with the securing member 33 which connects the valve 32 to the diaphragm 18. Therefore should it become necessary after the device has been assembled to remove the valve 32 for the purpose of repair, renewal, or any other reason, this may be readily accomplished by simply disconnecting the guide member 27 and the cap nut 25 and inserting a suitable tool through the aperture 23' into engagement with the member 33 for breaking the connection between the valve 32 and the diaphragm 18 whereupon the valve will be free to be removed through the lower portion of the valve body. When it is desired to replace the valve 32, the stem thereof may be inserted through the opening in the upper wall of the recess 26 into engagement with the diaphragm 18 and the securing member 33 advanced to connect the diaphragm and valve. From the foregoing, it will be apparent that the valve 32 may be removed and replaced without disconnecting the diaphragm 18 or disturbing the adjustment thereof.

From the foregoing it will be readily apparent that a valve constructed in accordance with this invention is distinguished for its simplicity, durability and ease with which the same may be manufactured, assembled or repaired. Furthermore, the arrangement of the parts is such that a high degree of efficiency and stability of operation is assured.

While one embodiment of the invention has been described and illustrated somewhat in detail it will be readily apparent that certain changes and modifications in the specific structure shown may be resorted to without departing from the spirit and scope of this invention and to this end reservation is made to make such changes as may come within the purview of the accompanying claims.

What I claim as my invention is:

1. An expansion valve comprising a casing formed with a recess and a passage for refrigerant, a valve guiding member projecting into said recess, said member being formed with a tubular portion, a valve member slidably supported in said tubular portion controlling said passage, a circumferential spacing flange formed on said member at the upper end thereof provided with a plurality of apertures through which the refrigerant is adapted to flow to said valve controlled passage, the lower end of said tubular portion being provided with a plurality of raidally extending passages, whereby the fluid entering the space below the valve acts as a hydraulic cushion.

2. An expansion valve comprising a casing formed with a recess and a fluid passage, a valve guiding member projecting into said recess and formed with a tubular portion, a valve slidable in said tubular portion controlling said passage, said tubular portion being provided adjacent the upper end thereof with a lateral extension having an aperture through which the fluid is adapted to flow to said valve controlled passage, the lower end of said tubular portion being apertured whereby the fluid entering the space below the valve acts as a hydraulic cushion.

In testimony whereof I affix my signature.

FRED J. HEIDEMAN.